May 11, 1965 A. R. HOFFMANN 3,182,534
CUTTING TOOL
Filed April 18, 1962 2 Sheets-Sheet 1
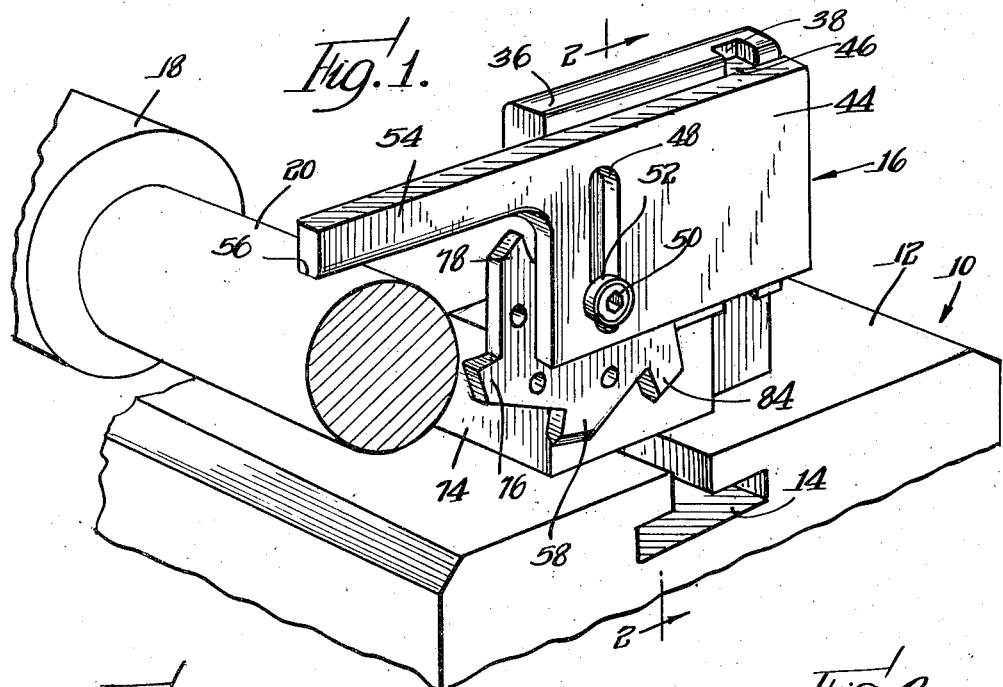
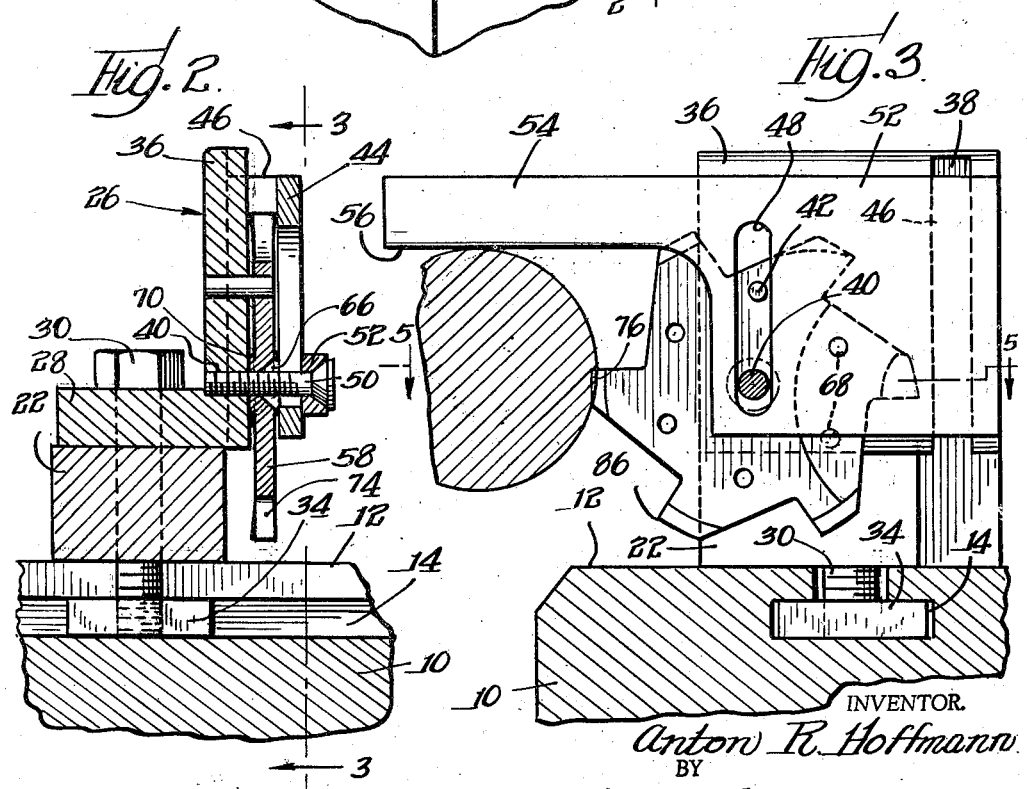
INVENTOR.
Anton R. Hoffmann
BY
Olson, Trexler, Wolters & Bushnell
Attys.

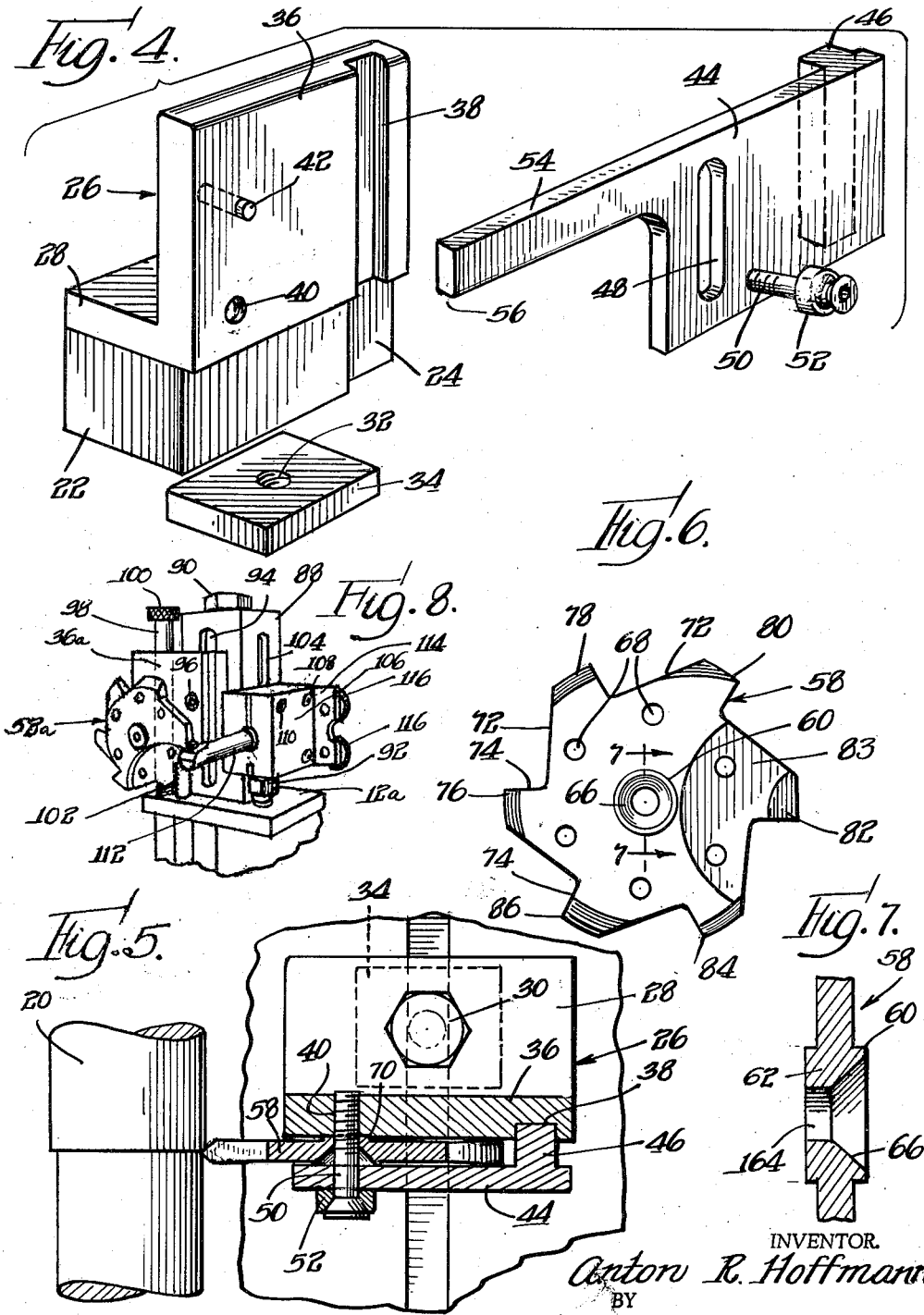

United States Patent Office 3,182,534
Patented May 11, 1965

3,182,534
CUTTING TOOL
Anton R. Hoffmann, 821 Northmoor Road,
Lake Forest, Ill.
Filed Apr. 18, 1962, Ser. No. 188,356
1 Claim. (Cl. 82—35)

This invention relates to machine tools and the like, and particularly to a novel multiple cutting edge tool for use with lathes and the like.

As is known, it often is desirable to cut off a piece of rotating stock carried by a lathe. Such stock often is supported only at one end in a chuck, and reactive forces from the cut-off tool have adverse effects. The workpiece or stock tends to climb over the tool and chatter and hogging-in result.

Accordingly, it is an object of this invention to provide a cut-off tool which prevents the work from climbing over the cutter edge of the tool.

More specifically, it is an object of this invention to provide a cut-off tool having a reaction member thereon canceling out the reactive force between the cutting edge and the workpiece.

More particularly, it is an object of this invention to provide a cut-off tool having a reaction member which is adjustable relative to the cutting edge, whereby to accommodate workpieces of different sizes.

In small machine shops, or in small volume production, it often is desirable to change from one cut-off bit to another. This can cause considerable confusion in trying to find a misplaced bit. Further, it requires a certain amount of time to change to conventional bits.

Accordingly, it is an object of this invention to provide a cut-off tool incorporating a plurality of bits which may be used alternately.

It is furthermore an object of this invention to provide a cut-off tool having a rotary bit provided with a plurality of different working portions which can be used alternately.

In high volume production a bit may wear out or become dull quite rapidly. Heretofore, this has necessitated changing bits. This, of course, has necessitated shutting down of production during such time.

Accordingly, it is an object of this invention to provide a cut-off tool or the like having a plurality of similar bits that can be brought into operating position simply and quickly without the necessity of shutting down production for an appreciable time.

More specifically, it is an object of this invention to provide a cut-off tool or the like having a rotary bit with a plurality of similar working or cutting portions which may be brought into working position successively.

Other and further objects and advantages of the present invention will be apparent from the following description when taken in connection with the accompanying drawings, wherein like numerals are utilized to identify like parts, and wherein:

FIG. 1 is a perspective view of a cut-off tool and associated machine parts constructed in accordance with the principles of this invention;

FIG. 2 is a vertical sectional view through the cut-off tool as taken substantially along the line 2—2 in FIG. 1;

FIG. 3 is a vertical view partly in section as taken along the line 3—3 in FIG. 2;

FIG. 4 is an exploded perspective view showing certain parts of the cut-off tool;

FIG. 5 is a horizontal view partly in section as taken substantially along the line 5—5 in FIG. 3;

FIG. 6 is a face or axial view of the cutter or bit of the present invention;

FIG. 7 is a fragmentary, diametral view of the cutter or bit as taken substantially along the line 7—7 in FIG. 6; and FIG. 8 is a perspective view on a decreased scale of a modification of the invention.

Turning now in greater particularity to the drawings, and first to FIG. 1, there are shown parts of a conventional machine tool or lathe, including a table or base generally designated as 10, and having an upper surface 12. The table or base is provided with an inverted T-shaped slot 14, by means of which there is mounted the cut-off tool 16 forming the subject matter of this invention. The machine tool also includes a chuck 18 or the like holding a workpiece 20, illustrated as a cylindrical rod, for rotation thereof. These parts are all quite conventional, and hence are shown in somewhat rudimentary fashion.

Considering now also FIGS. 2–5, the multi-tool 16 will be seen to include a rectangular block 22 relieved at one corner thereof as at 24, and resting on the surface 12 of the base or table 10 immediately above the T-shaped slot 14. A generally L-shaped tool base 26 is positioned on top of the block 22, and includes a horizontal rectangular flange 28 resting on the block 22.

A bolt or cap screw 30 passes through aligned apertures in the horizontal flange 28 and in the block 22, and down into the T-shaped slot 14, being received in the threaded central aperture 32 of a square nut 34 riding in the slot. This type of connection is known, and it is further known that the tool may be keyed to the stem of the slot, positively to prevent rotation or twisting thereof about the bolt 30. As is known, the bolt or cap screw may be loosened for adjusting the tool longitudinally of the slot 14.

It is at this point that the invention departs from conventional practice. The tool base 26 is provided with an upstanding, vertical wall or flange 36 integral with the horizontal flange 28. The front face of the vertical flange 36 is provided with a vertical guideway 38 overlying the cut-off or relieved area 24 of the base or block 22. The guideway 38 is near the right end of the vertical flange 36 as viewed in the drawings. Near the lower left corner there is a threaded aperture 40, and immediately above this is the protruding end of a pin 42 firmly fixed in a complementary aperture in the vertical flange or wall 36. Alternatively, the pin 42 may be slidably received in the wall 36, whereby it can be recessed for quicker indexing.

A rigid steel plate 44 is provided on its back face with a vertical key 46 received in the slot or guideway 38. The key is of greater depth than the slot 38, as will be brought out presently. In addition, the plate is provided with a vertically elongated slot 48 in alignment with the threaded aperture 40 in the vertical wall or flange 36. A screw or bolt 50 extends through this slot. As is shown in the drawings, this screw conveniently is of the bevel-head type, and fits through a complementary washer or spacer 52 which is of larger diameter than the slot 48 for clamping against the plate 44 when the screw is tightened. The washer converts the flat head bolt to a shoulder bolt.

The plate 44 is provided with an integrally extending support arm 54, having an undersurface 56 riding against the top of the workpiece 20. As will be apparent, the plate 44, and hence the arm 54, is readily adjustable in a vertical position by means of screw 50 received through the slot 48, and the cooperation of the key 46 and guideway 38. Thus, the arm 54 may ride on top of workpieces of markedly different sizes. The bottom surface of the overarm which is in contact with the work is at 90° to the slot which is vertical. This assures that the overarm will move horizontally.

Attention should now be directed to FIGS. 6 and 7 in addition to the foregoing figures. There will be seen a bit or cutting tool generally designated 58. This bit is of a generally circular nature, differing from a circle as set forth hereinafter, and is provided with central hubs on opposite faces hereinafter identified as a front hub 60, and as a back hub 62. The screw 50 passes through the bore 64, as well as through the slot 48.

The bit 58 also is provided with a series of apertures 68 lying on a common circle concentric with the bore 64, and positioned for selective reception of the extending end of the pin 42. The cutting edges, in accordance with the best practice, are slightly wider than the thickness of the tool. Accordingly, with the tool or bit clamped in working position, the back hub and the sides of the various cutting edges abut the front face of the wall 36.

In the illustrative embodiment of the invention, there are six equally arcuately spaced apertures 68. Adjacent to each such aperture the bit 58 is provided with a chordal cut-off or surface 72 leading to a substantially radial cutting edge 74. As will be understood, the surfaces or edges 72 and 74 preferably meet at small radii. The outer extremities of the cutting edges are, according to different concepts of the invention, all identical or different to provide different types of turning, threading or cut-off. For example, in FIG. 6, different types of tips or outer ends of the cutting edges or surfaces are shown. Thus, the tip 76, which is shown in cutting position, is a left-handed turning tool. Proceeding in a clockwise direction, the next tip 78 is a left-hand facing or cornering tool. Following this, the tip 80 is a right-hand facing or cornering tool. The succeeding tip 82 is a straight cut-off tool. The bit is thinned down at 83 on opposite faces in the vicinity of the cut-off tool tip 82. The next succeeding tool is illustrated as a threading tool tip 84, with the last tip 86 being a right-hand turning tool. Thus, although reference heretofore has been made specifically to a cut-off tool, it will be seen that the cutting tool herein shown and described is adapted for other cutting operations on a turret lathe or the like.

In the illustrative example of the invention, the screw 50 passes through the spacer or washer 52, the screw head and washer having complementary bevels, through the plate 44 (specifically through the slot 48), and through the bit 58 into the threaded aperture 40 in the vertical flange or wall 36, the back hub 62 of the bit 58. The front hub 60 engages the back surface of the plate 44, whereby the hub 62 is clamped against the front surface of the wall 36. The thickness of the key 46 is sufficient to maintain the plate 44 parallel to the wall 36.

As will be understood, the vertical height of the cutting edge 74 which is in cutting position is adjustable by placing shims beneath the block 22, or between the block 22 and the base 26, in accordance with conventional machine tool practice. The cutting edge is positioned slightly below the horizontal diameter of the workpiece 20, and the table 10 is fed radially in toward the workpiece 20 in accordance with conventional practice. The reaction force of the workpiece against the cutting edge 74 tends to cause the workpiece 20 to deflect upwards. However, the arm 54 overlies the top of the workpiece and rides firmly thereagainst. Hence, all reaction forces are taken up between the cutting surface or edge 74 and the arm 74, and no transverse thrust is imposed on the workpiece 20, thereby avoiding bending of the workpiece and defective cutting off, or undue wear on the rotating chuck or the like 18 and its associated parts. The successive cutting edges are selectively brought into position simply by loosening the screw 50, manually retracting the plate 44 a short distance along with the bit 58, and rotating the bit. The screw then is tightened down to hold the bit locked in position with the end of the pin 42 selectively received in one of the apertures 68. If a sliding pin is used, the screw is loosened, the pin retracted, and the bit rotated.

In some instances, it may not be necessary or desirable to have the arm 54 overlie the workpiece. Accordingly, the plate 44 may be removed. At the same time, the spacer or washer 52 is removed, and the beveled undersurface of the head of the screw 50 is received directly in the bevel 66 in the front hub of bit 58. The bit remains rotatably adjustable in the same manner as heretofore described.

Each cutting edge or surface of the bit is preferably provided with back clearance, for example, 3 degrees, in accordance with the best machine shop practice. This makes the outer edge very slightly thicker than the remainder of the disc.

The disc can be made of suitable tool steel properly tempered to produce cutting edges of long life. Alternatively, the cutting edges can be inserted carbide tips, as is known in accordance with machine tool practice.

As will now be apparent, a large number of successive cutting edges can quickly be brought into use in any desired sequence. All of the cutting edges can be similar when a large number of workpieces is to be handled in a single similar manner, whereby to avoid downtime while cutting edges are changed. Alternatively, different types of cutting edges may be brought into position for performing somewhat different operations on the workpiece. As a result, it is not necessary for the operator to take long periods of time in adjustment, and it is not necessary for him to look for the proper bits. As will be appreciated, a given job number can be etched on the bit or blade so that it is a simple matter to remove the bit from storage for repetitive jobs. This would enable operator to set up a job very quickly.

An improved form of the invention is shown in FIG. 8. Many of the parts are similar to those heretofore shown and described, and are identified by similar numerals with the addition of the suffix *a*. The plate or wall 36*a* is mounted on the front of a pedestal 88 held to the top of the table 12*a* by a large bolt 90 passing through the pedestal and threaded into the table. The pedestal is rotatably adjustable in 90 degree increments by loosening the bolt 90 and slightly raising the pedestal. The pedestal preferably is keyed to the table, for example, by an abutment against the head of a bolt 92 threaded into the table 12*a*. Various other keying expedients can be used alternatively to this.

The pedestal is provided on its front face with a vertically elongated slot 94, and the plate 36*a* is held to the pedestal by means of a bolt or screw 96, preferably of a type with a recessed driving head, passing through the plate 36*a* and the slot 94 into a T-nut within the pedestal and extending forwardly into the slot 94. A long vertical bolt 98 having a knurled head 100 is threaded through a section of the plate 36*a* or a nut member fixed thereon with the bottom end of the bolt abutting against the top of the table 12*a* at 102. Upon loosening of the bolt or screw 96, the bolt 98 can be turned to raise or lower the plate 36*a*, thereby to vary the cutting or working height of the operative cutting edge of the tool without the necessity of resorting to shims.

The support arm 54 and related parts are not shown in FIG. 8, but it will be understood that they can be provided in the same manner as heretofore shown and described.

Another face of the pedestal 88 at right angles to the face bearing the slot 94 is provided with a similar vertically elongated slot 104. A split block 106 is adjustably mounted on this latter face of the pedestal, again by means of one or more T-nuts and one or more bolts 108 threaded thereinto. An additional bolt 110 is provided for clamping the split block about a conventional boring bar 112. This boring bar is readily brought into operative position upon 90 degree rotation of the pedestal 88. The head of the bolt 92 serves as an adjustable bottom stop for the block 106.

Plate means 114 extend out from the block 106 and rotatably support knurling cutters 116 which can be brought into operative position by rotating the pedestal 88 180 degrees from the position shown.

Although a particular embodiment of the invention has been herein shown and described, it will be understood that other mechanical variations are possible. Changes in structure which may be apparent to those skilled in the art will be understood as coming within the ambit of this invention insofar as they fall within the spirit and scope of the appended claim.

The invention is hereby claimed as follows:

A cutting tool for use with a lathe or the like comprising a base, means for mounting said base on a supporting table or the like, a rotatable bit having a plurality of cutting edges spaced about its periphery, means for mounting said bit from said base for rotary adjustment, means for locking said bit in any of a plurality of preselected positions of adjustment with a preselected cutting edge in cutting position for cutting a workpiece, means rigid with the locked bit and including an overarm having a straight horizontal edge extending in the direction of feed of said tool and projecting in spaced relation from the cutting edge in cutting position and engageable with a workpiece in opposition to said cutting edge to take up reaction forces between the workpiece and the cutting edge in cutting position, and means for adjusting the spacing between the cutting edge in cutting position and the projecting means overarm while maintaining the cutting edge at a constant angle to the workpiece, said adjusting means including a bolt-in-slot adjustment with the bolt passing through the bit and forming at least a part of the means for rotatably mounting said bit.

References Cited by the Examiner
UNITED STATES PATENTS

| | | | |
|---|---|---|---|
| 245,668 | 8/81 | Smith | 82—35 |
| 632,678 | 9/59 | Dock | 29—102 |
| 652,643 | 6/00 | Rivett. | |
| 735,254 | 8/03 | Hartness | 82—35 X |
| 1,161,056 | 11/15 | Liebstein | 82—35 |
| 1,413,326 | 4/22 | Dover | 29—102 |
| 1,740,604 | 12/29 | Kienzl | 29—102 X |
| 2,373,301 | 4/45 | Erickson | 82—35 |
| 2,621,396 | 12/52 | Gracchi. | |
| 2,875,662 | 3/59 | Poorman | 82—36 |

WILLIAM W. DYER, Jr., *Primary Examiner.*